(12) United States Patent
Nobutani

(10) Patent No.: US 10,360,549 B2
(45) Date of Patent: Jul. 23, 2019

(54) PRINTING SYSTEM AND PRINTER

(71) Applicant: Seiko Epson Corporation, Tokyo (JP)

(72) Inventor: Tsutomu Nobutani, Redondo Beach, CA (US)

(73) Assignee: SEIKO EPSON CORPORATION, Tokyo (JP)

( * ) Notice: Subject to any disclaimer, the term of this patent is extended or adjusted under 35 U.S.C. 154(b) by 716 days.

(21) Appl. No.: 14/381,736

(22) PCT Filed: Mar. 28, 2013

(86) PCT No.: PCT/JP2013/002149
§ 371 (c)(1),
(2) Date: Aug. 28, 2014

(87) PCT Pub. No.: WO2013/145766
PCT Pub. Date: Oct. 3, 2013

(65) Prior Publication Data
US 2015/0073890 A1 Mar. 12, 2015

(30) Foreign Application Priority Data

Mar. 23, 2012 (JP) .................................. 2012-066923
Mar. 30, 2012 (JP) .................................. 2012-079643

(51) Int. Cl.
G06Q 20/20 (2012.01)
G06Q 30/02 (2012.01)
(Continued)

(52) U.S. Cl.
CPC ......... *G06Q 20/209* (2013.01); *G06F 3/1222* (2013.01); *G06F 3/1236* (2013.01);
(Continued)

(58) Field of Classification Search
CPC .................. G06Q 20/209; G06Q 30/0238; G06F 3/1236; G06F 3/1292; G06F 3/1222;
(Continued)

(56) References Cited

U.S. PATENT DOCUMENTS 5,987,426 A * 11/1999 Goodwin, III ......... G06Q 20/20
705/16
6,607,314 B1 * 8/2003 McCannon ........... G06F 9/4411
400/62
(Continued)

FOREIGN PATENT DOCUMENTS

| CN | 102044116 A | 5/2011 |
|---|---|---|
| JP | 2002-307783 | 10/2002 |

(Continued)

OTHER PUBLICATIONS

Vasilev, Julian. "Guidelines for improvement information processes in commerce by implementing the link between a web application and cash registers." Theory and Applications of Mathematics & Computer Science 2.2 (2012): 55-66.*

*Primary Examiner* — Asfand M Sheikh
(74) *Attorney, Agent, or Firm* — Foley & Lardner LLP

(57) ABSTRACT

A printing system can easily configure a data terminal when a POS application running on a server is used from a data terminal.
A POS system has a server that runs a POS application, a data terminal, and a printer communicatively connected through the Internet to the server. The printer has a local communication unit that establishes communication with the data terminal, a communication relay unit that communicatively connects the data terminal and the server, a configuration settings acquisition unit that gets configuration settings to configure the POS application from the server, and an application configuring unit that configures the POS (Continued)

application based on the configuration settings to use the POS application from the data terminal.

20 Claims, 6 Drawing Sheets

(51) Int. Cl.
G07G 1/00 (2006.01)
G07G 1/12 (2006.01)
G06K 15/00 (2006.01)
G06F 3/12 (2006.01)

(52) U.S. Cl.
CPC .......... *G06F 3/1238* (2013.01); *G06F 3/1287* (2013.01); *G06F 3/1292* (2013.01); *G06K 15/4095* (2013.01); *G06Q 30/0238* (2013.01); *G07G 1/0009* (2013.01); *G07G 1/12* (2013.01)

(58) Field of Classification Search
CPC ................ G06F 3/1238; G06F 3/1287; G06K 15/4095; G07G 1/12; G07G 1/0009
See application file for complete search history.

(56) References Cited

U.S. PATENT DOCUMENTS

| 7,120,677 | B1* | 10/2006 | Berger | G06Q 10/06 709/219 |
|---|---|---|---|---|
| 9,001,342 | B2* | 4/2015 | Takamoto | G06F 9/455 358/1.13 |
| 9,110,615 | B2* | 8/2015 | Hirayama | G06F 3/1206 |
| 9,311,029 | B2* | 4/2016 | Ito | G06F 3/1231 |
| 9,342,264 | B2* | 5/2016 | Takasu | G06F 3/1209 |
| 2002/0159090 | A1 | 10/2002 | Nobutani et al. | |
| 2003/0154110 | A1* | 8/2003 | Walter | G06F 19/322 705/3 |
| 2004/0193942 | A1* | 9/2004 | Barr | H04L 1/1806 714/4.4 |
| 2005/0207635 | A1* | 9/2005 | Lazar | G06F 17/211 382/139 |
| 2005/0240480 | A1 | 10/2005 | Ito | |
| 2005/0242178 | A1* | 11/2005 | Minowa | G06Q 30/0225 235/383 |
| 2006/0168249 | A1* | 7/2006 | Billiard | G06F 17/3089 709/228 |
| 2006/0208088 | A1 | 9/2006 | Sekiguchi | |
| 2007/0276763 | A1* | 11/2007 | Kleinman | G06Q 20/382 705/64 |
| 2009/0032584 | A1 | 2/2009 | Yamada et al. | |
| 2009/0254900 | A1 | 10/2009 | Nakamura | |
| 2011/0087535 | A1 | 4/2011 | Yoshizawa et al. | |
| 2011/0199640 | A1 | 8/2011 | Shirai | |
| 2012/0307263 | A1* | 12/2012 | Ichikawa | G06F 3/1208 358/1.8 |
| 2013/0094047 | A1* | 4/2013 | Bailey | H04L 63/18 358/1.14 |

FOREIGN PATENT DOCUMENTS

| JP | 2004-252703 | 9/2004 |
|---|---|---|
| JP | 2004-310246 A | 11/2004 |
| JP | 2006-201997 | 8/2006 |
| JP | 2008-033415 | 2/2008 |
| JP | 2008-090578 | 4/2008 |
| JP | 2010-061378 | 3/2010 |
| JP | 2011-065328 | 3/2011 |
| JP | 2012-027633 | 2/2012 |
| TW | 1330342 B | 9/2010 |

* cited by examiner

PRINTING SYSTEM AND PRINTER

TECHNICAL FIELD

The invention relates to a printing system including a server, a data terminal, and a printer communicatively connected over a network, and to the printer of the printing system.

The present application claims priority based on and incorporates by reference the entire contents of Japan Patent No. 2012-066923 filed in Japan on 2012 Mar. 23, and Japan Patent No. 2012-079643 filed on 2012 Mar. 30.

BACKGROUND

In a printing system such as described above, the printer is connected to the data terminal, which is communicatively connected to the Internet, and communication between the printer and the server passes through the data terminal (see, for example, PTL 1).

When the Internet connection becomes unstable in a system that connects a server and a data terminal over the Internet and uses an application program that runs on the server from the data terminal, operation of the application program used by the data terminal becomes unstable. Addressing this problem, PTL 2, for example, describes a system that connects the server and a proxy server over the Internet, connects the proxy server and the data terminal over a LAN, downloads the application program from the server to the proxy server and runs the program on the proxy server, and uses the application program running on the proxy server from the data terminal. Because the data terminal uses an application program running on a proxy server connected to a LAN in this system, operation of the application program used by the data terminal is stable regardless of the state of the Internet connection.

CITATION LIST

Patent Literature

[PTL 1] JP-A-2006-201997
[PTL 2] JP-A-2008-90578

SUMMARY OF INVENTION

Technical Problem

Because the data terminal is connected directly to a global network such as the Internet using the technology described in PTL 1, a communication setting such as assigning a global IP address to each individual data terminal is required. Furthermore, when using an application program that runs on a server from a data terminal, settings enabling using the application program must be made on each data terminal. In order to apply communication settings and settings for using an application individually to the data terminals, configuring these settings becomes complicated when installing a printing system having plural data terminals or when replacing a data terminal due to an equipment failure, for example.

With the technology described in PTL 2, if a service provided by the application program is a service that is completed on a LAN or other local network, the same service can be provided by the application program even if the application program is downloaded from the server to a proxy server (relay device) and run on the proxy server. However, when a service that is not completed on the local network is included in the services provided by the application program, such as when a service executed based on input on the server side is included, providing the same service as when the application program runs on the server is difficult when the application program is downloaded from the server and run on the proxy server.

Considering the foregoing problems, an object of the present invention is to provide a printing system in which configuring the data terminal is simple when using an application program that runs on a server from the data terminal, and both an application program that runs on a server and an application program that runs on a relay device can be used from a data terminal connected to the server through the relay device.

Solution to Problem

Example 1

A printing system according to the invention includes a server on which a POS application program runs; a data terminal having a communication capability; and a printer connecting communicatively to the server through a network; the printer including a communication unit that communicatively connects to the data terminal, a communication relay unit that communicatively connects the data terminal and the server through the network, a configuration settings acquisition unit that acquires configuration settings to configure the POS application from the server based on printer-specific identification information unique to the printer, and an application configuring unit that configures the POS application based on the configuration settings when communication with the data terminal is established, and enables using the POS application from the data terminal.

In this configuration, a printer communicatively connected to a server through a network has a communication relay function that communicatively connects a data terminal and the server. Network communication settings therefore do not need to be made on the data terminal. Furthermore, because the printer configures the POS application, settings on the data terminal for using POS application can be eliminated or simplified. Configuring the data terminal is therefore simplified. Furthermore, because the printer acquires the configuration settings of the POS application based on printer-specific identification information, the configuration settings of the POS application can be managed related to the printer-specific identification information. Note that the POS application is an application program as an example of a printing application, and has a function for printing images on paper using a printer, or instead of or in addition this function, has functions for editing, displaying, transmitting, and storing images or data on which images are based.

Example 2

In the invention, the communication unit has a password generating unit that generates a password based on the printer-specific identification information, a password output unit that outputs the password, a password receiving unit that receives the password from the data terminal, and a communication establishing unit that establishes communication with the data terminal based on the password generated by the password generating unit and the password received by the password receiving unit; and the data terminal has a password input unit that receives input of the password, and a password transmitting unit that sends the password input to the password input unit to the printer.

This configuration provides security on the local network between the printer and the data terminal. Local network security can also be managed using the printer-specific identification information.

Example 3

In the invention, the communication unit has a unique data terminal identifier acquisition unit that acquires a unique data terminal identifier specific to the data terminal from the data terminal when establishing communication with the data terminal; a password mixing unit that combines all or part of the printer-specific identification information, data terminal connection attributes sent from the server, the unique data terminal identifier, and time information in the password generating unit; and a connection control unit that limits connection to the printer and the server from a data terminal that communicatively connects to the printer based on all or part of the unique data terminal identifier, the printer-specific identification information, the data terminal connection attributes, and the time information.

This configuration can improve the security of the local network between the printer and the data terminal, and can improve the security of communications between the data terminal and the server through the printer. The data terminal connection attributes sent from the server include, for example, the number of data terminals allowed to connect to the printer; the type or model of data terminal that can connect; and the time communication between the data terminal and server is permitted.

Example 4

In the invention, the password output unit prints the password as an optically-readable code; and the data terminal has an input unit that inputs the code, and an analyzing unit that analyzes the code, and acquires and supplies the password to the password input unit.

This configuration can easily establish communication between the printer and data terminal because the password can be input using a camera or other reading device. Optically readable codes include barcodes and other 2D codes, and printed encrypted numbers. When the code is a 2D code or printed encrypted number, the code can be input to the input unit using the reading device. When the code is a printed encrypted number, the operator can read and input the code to the input unit.

Example 5

In the invention, the password output unit outputs a code encrypting the password by near-field communication; and the data terminal has a receiving unit that receives the code, and an analyzing unit that analyzes the code, and acquires and supplies the password to the password input unit.

Because inputting the password is simple with this configuration, the task of establishing communication between the printer and data terminal is simplified.

Example 6

In the invention, the unique data terminal identifier is an ID code stored in the data terminal, an optically readable ID code affixed to the data terminal, or electronic tag data of fixed to the data terminal.

Electronic tag data is, for example, RFID tag data.

Example 7

In the invention, the printer has a forgery prevention data generating unit that generates forgery prevention data in the password generating unit, and a forgery prevention data print unit that prints the forgery prevention data on the print medium when printing on the print medium.

Because the forgery prevention data makes identifying the printer that printed on the print medium simple, forgery of printed print media can be prevented or suppressed.

Example 8

In the invention, a first application program runs on the server; a second application program runs on the printer communicatively connected to the server through a first network; the data terminal is communicatively connected to the printer through a second network; the printer has a data merging unit that acquires first display information generated by the first application program and generates third display information combining the first display information with second display information generated by the second application program, and a print unit that prints print data generated by the second application program; and the data terminal has a display unit that acquires and displays the third display information.

In this configuration, the printer functioning as a relay device between the server and data terminal acquires first display information generated by a first application program running on the server, combines this first display information with second display information generated by a second application program running on the printer, and produces third display information. The data terminal connected to the printer acquires and displays the third display information. The first application program running on the server, and the second application program running on the printer, can therefore both be used from the data terminal. If the second application program running on the printer is an application program essential to business operations, and the application program running on the server is an application program for performing a task complementary to the essential operation, essential operations using the second application program can continue without interruption even if the first network connection becomes unstable.

Example 9

In the invention, the data terminal has an input unit that receives first information input to the first application program and second information input to the second application program, and a transmission unit that sends the first information and the second information input to the input unit to the printer; and the printer has a communication relay unit that sends the first information from the data terminal to the server.

This configuration enables both input to the first application program running on the server and input to the second application program running on the printer from the data terminal.

Example 10

In the invention, the printer has a connection monitor that monitors the connection to the server, and an input/output termination unit that stops at least one of receiving the first information by the input unit and transmission to the server when interruption of the server connection is detected.

When the first network connection is lost, this configuration stops input to the first application program from the data terminal or transmissions from the printer to the server. Transactions through the first network can therefore be avoided.

Example 11

In the invention, the data merging unit combines stop-input data indicating input of the first information from the data terminal is stopped with the second display information to generate the third display information when interruption of the server connection is detected.

This configuration can inform the operator using the data terminal that the first application program cannot be used from the data terminal.

Example 12

In the invention, the data merging unit outputs stop-input data indicating input of the first information from the data terminal is disabled by sound from the data terminal when interruption of the server connection is detected.

This configuration can inform the operator using the data terminal that the first application program cannot be used from the data terminal.

Example 13

In the invention, the data merging unit outputs stop-input data indicating input of the first information from the data terminal is disabled by vibration from the data terminal when interruption of the server connection is detected.

This configuration can inform the operator using the data terminal that the first application program cannot be used from the data terminal.

Example 14

In the invention, the communication relay unit temporarily stores the first information if loss of the server connection is detected when sending the first information to the server, and sends the first information to the server after the server connection is re-established.

When the connection to the first network is interrupted after first information is input to the data terminal, this configuration sends the first information to the server after the connection is restored, and enables the first application program to execute a data process based on the first information.

Example 15

In the invention, a web browser runs on the data terminal; and the web browser embodies the display unit, the input unit, and the transmission unit.

This configuration enables using a generic data terminal that runs a web browser as the data terminal.

Example 16

In the invention, the first application program generates and sends second print data to the printer; and the print unit has a print control unit that, when the printer receives the second print data, controls whether or not to print, the printing range, the printing position, and the print timing of the second print data, combines the second print data with the print data, and prints.

This configuration enables a first application program running on the server to execute a printing process.

Example 17

In the invention, the first application program is a coupon-issuing application that generates coupon print data to print a coupon based on the first information; the second application program is a second POS application program that generates transaction information to print a receipt based on the second information; the transaction information is the print data; and the coupon print data is the second print data.

This configuration enables using the printing system as a POS system.

Example 18

A printer according to the invention is a printer of the printing system described above.

Because the printer in this configuration has a communication relay unit, the data terminal and server can communicatively connect by applying the network communication settings to the printer, and configuring the data terminal for communication can be simplified. Furthermore, because the printer configures the POS application, settings for using the POS application can be omitted or simplified on the data terminal. Because configuring the data terminal is therefore simplified, a printing system using a printer according to the invention can be easily constructed. Furthermore, because the printer gets configuration settings for configuring the POS application from the server based on printer-specific identification information unique to the printer, the configuration settings of the POS application can be managed related to the printer-specific identification information.

Example 19

A printer according to the invention includes: a first communication unit that communicatively connects to a server through a first network; a processor that runs a second application program; a second communication unit that communicatively connects through a second network to a data terminal, and receives first information input to the first application program from the data terminal, and second information input to the second application program; a data merging unit that communicatively connects to a server through a first network and acquires first display information generated by the first application program running on the server, combines the first display information with second display information generated by the second application program, and generates third display information displayable by the data terminal; a print unit that prints print data generated by the second application program; and a communication relay unit that sends the first information from the data terminal through the first network to the server.

In this configuration, the printer communicatively connected to the server and data terminal acquires first display information generated by a first application program running on the server, combines this first display information with second display information generated by a second application program running on the printer, and produces third display information. The printer also relays and sends the first information input to the data terminal to the server. The first application program running on the server, and the second application program running on the printer, can therefore both be used from the data terminal connected to the printer.

Example 20

The invention is further characterized by a connection monitor that monitors the connection to the server; and an input/output termination unit that stops at least one of receiving the first information by the input unit and transmission to the server when interruption of the server connection is detected; the data merging unit combining stop-input data indicating input of the first information from the data terminal is stopped with the second display information to generate the third display information when interruption of the server connection is detected.

When the server connection is interrupted, this configuration can prevent transactions with the server. That the first application program cannot be used can also be displayed on the data terminal connected to the printer when the server connection is interrupted.

Advantageous Effects of Invention

Because a printer communicatively connected through a network to a server has a communication relay function that communicatively connects a data terminal with the server, there is no need with the invention to apply network communication settings to the data terminal. Furthermore, because the printer configures the POS application, settings on the data terminal for using the POS application can be omitted or simplified. In addition, because the printer acquires the configuration settings of the POS application based on printer-specific identification information, the configuration settings of the POS application can be managed related to the printer-specific identification information.

A printer according to the invention functioning as a relay device between the server and data terminal acquires first display information generated by a first application program running on the server, combines this first display information with second display information generated by a second application program running on the printer, and produces third display information that can be displayed on the data terminal. A first application program running on the server, and a second application program running on the printer, can therefore both be used from the data terminal.

DESCRIPTION OF EMBODIMENTS

Embodiment 1

A printer and a POS system as an example of a printing system according to the first embodiment of the invention are described below with reference to FIG. 1 to FIG. 3. Note that the first embodiment relates to connection settings for using the POS system.

General Configuration of a POS System

Figure 1:
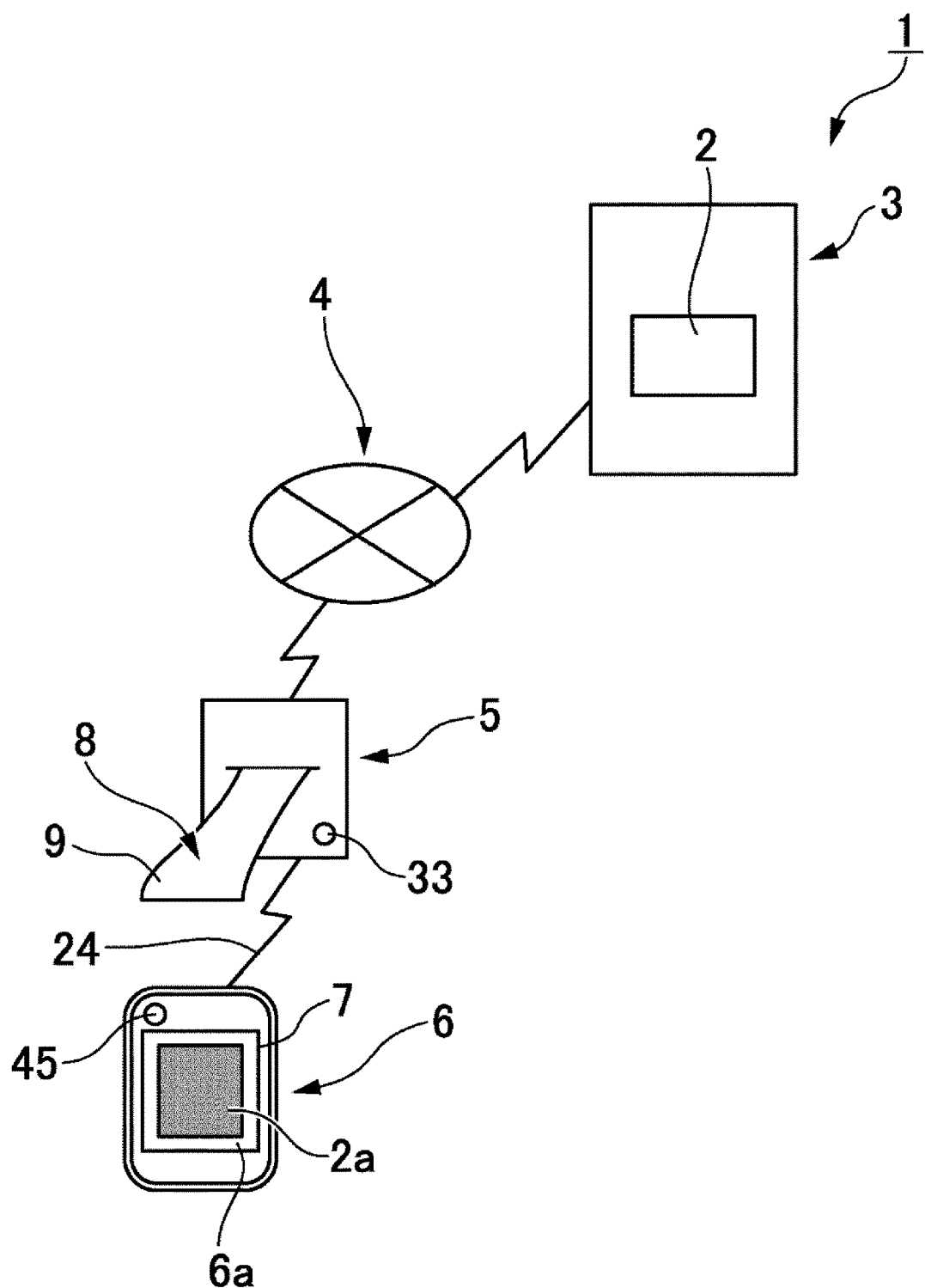
FIG. 1 schematically shows the configuration of a POS system according to a first embodiment of the invention.

A POS system used as an example of a printing system according to the first embodiment of the invention is described first with reference to FIG. 1. FIG. 1 shows the basic configuration of a POS system according to the first embodiment of the invention.

As shown in FIG. 1, the POS system 1 includes a server 3 on which a POS application program (printing application program) 2 runs, a printer 5 that is communicatively connected to the server 3 over the Internet (network) 4, and a data terminal 6 with a communication function. The data terminal 6 communicatively connects to the printer 5, and communicatively connects to the server 3 through the printer 5.

The data terminal 6 and printer 5 are installed at a checkout counter in a store. The server 3 is, for example, installed in an office separated from the store. A web browser 7 runs on the data terminal 6, and the POS application program 2 can be used from the data terminal 6 through the web browser 7. A transaction process is executed at the checkout counter using the data terminal 6, and a receipt 8 is issued from the printer 5. More specifically, the printer 5 prints transaction information generated by the transaction process on receipt paper 9.

Server

The server is described next with reference to FIG. 2. FIG. 2 is a schematic block diagram of the POS system according to the first embodiment of the invention.

Figure 2:
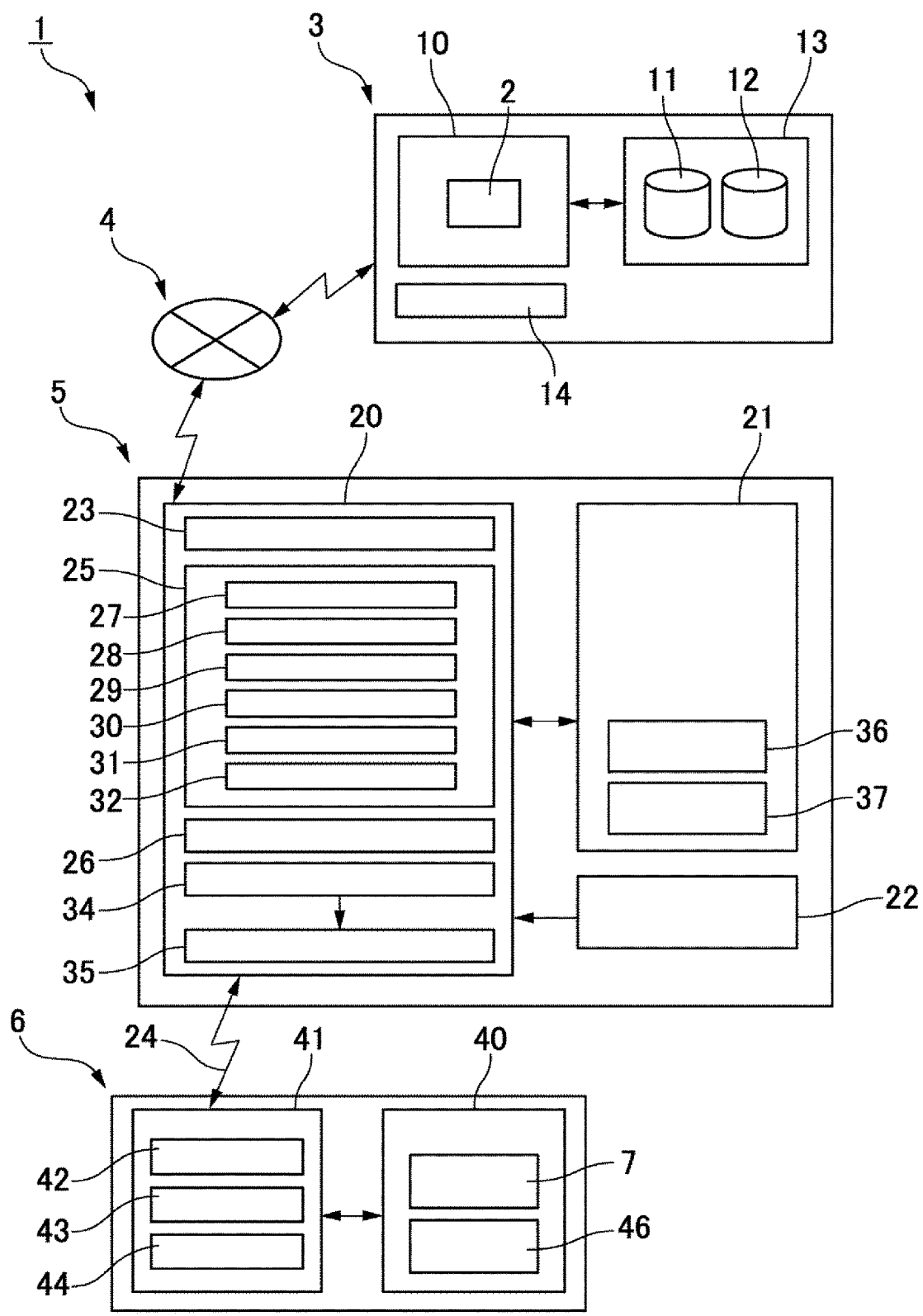
FIG. 2 is a basic block diagram of a POS system according to the first embodiment.

As shown in FIG. 2, the server 3 has a processor 10 that runs the POS application program 2, a database unit 13 that stores a product information database 11 and a transaction information database 12, and a configuration settings storage unit 14 that stores configuration settings for using the POS application from the data terminal 6.

The POS application program 2 has a web page 2a (FIG. 1) that can be displayed by the web browser 7 as a front end. The POS application program 2 accesses the product information database 11 based on input to the web page 2a to get product information such as product price information, and executes a transaction process. The POS application program 2 also displays the transaction information on the web page 2a, sends transaction information from the server 3 to the printer 5 based on input of a print receipt command to the web page 2a, and prints the transaction information with the printer 5. When transaction information is generated, the POS application program 2 also updates the transaction information database 12 based on the generated transaction information.

Included in the configuration settings are the URL for accessing the web page 2a of the POS application program 2, and the addresses on the server 3 of the product information database 11 and transaction information database 12 used by the POS application program 2. The configuration settings are stored in the configuration settings storage unit 14 related to the serial number (printer-specific identification information) for identifying a specific printer 5.

Printer

A printer according to the first embodiment of the invention is described with reference to FIG. 2. The printer 5 has a communication unit 20 that controls communication with an external device, and a print unit 21 that controls printing. The printer 5 has nonvolatile memory 22 that stores the URL for getting the configuration settings of the POS application program 2, and a serial number.

The communication unit 20 includes an Internet communication unit 23 communicatively connected to the server 3 and printer 5 through the Internet 4; a local communication unit 25 that communicatively connects the printer 5 and data terminal 6 through a wireless LAN (wireless communication) 24; and a communication relay 26 that communicatively connects the data terminal 6 and server 3 through the wireless LAN 24 and Internet 4. The local communication unit 25 includes a network name generator 27, password generator 28, password output unit 29, network name receiver 30, password receiver 31, and communication establishing unit 32.

Based on the serial number of the printer 5, the network name generator 27 generates a network name of the wireless LAN 24 that connects the printer 5 and the data terminal 6. Based on the serial number of the printer 5, the password generator 28 generates a password for connecting the data terminal 6 to the wireless LAN 24. The password output unit 29 outputs the password as a 2D code. More specifically, the password output unit 29 converts the password produced by the password generator 28 to a 2D code, supplies this 2D code to the print unit 21, and prints the 2D code on the receipt paper 9. The 2D code is printed in this embodiment by operating a switch 33 (FIG. 1) on the printer 5. Barcodes and color barcodes are examples of a 2D code.

The network name receiver 30 then receives the network name sent from the data terminal 6 to the printer 5. The password receiver 31 receives the password sent from the data terminal 6 to the printer 5. The communication establishing unit 32 then establishes communication with the data terminal 6 based on the network name produced by the network name generator 27 and the network name received by the network name receiver 30 from the data terminal 6, and the password generated by the password generator 28 and the password received by the password receiver 31 from the data terminal 6. The data terminal 6 and printer 5 are therefore communicatively connected when the network names and passwords match.

The communication unit 20 also includes a configuration settings acquisition unit 34 that gets the configuration settings from the server 3; and an application configuration unit 35 that configures the POS application program 2 based on the configuration settings once communication with the data terminal 6 is established, enabling using the POS application program 2 from the data terminal 6.

The configuration settings acquisition unit 34 accesses the URL stored in memory 22 (in this embodiment, the URL of the configuration settings storage unit of the server 3), and downloads the configuration settings linked to the serial number. The URL stored in the memory 22 is stored when the printer 5 is shipped.

The application configuration unit 35 sends the addresses of the product information database 11 and transaction information database 12 contained in the configuration settings to the server 3, and sets the product information database 11 and transaction information database 12 that the POS application program 2 uses. The application configuration unit 35 starts the web browser 7 on the data terminal 6 to which a communication link with the printer 5 was established, and accesses the URL contained in the configuration settings. As a result, the web page 2a of the POS application program 2 is displayed on the browser running on the data terminal 6. The POS application program 2 can therefore be used from the data terminal 6.

The print unit 21 prints a receipt 8 when transaction information is supplied from the server 3. The print unit 21 also includes a forgery prevention data generator 36 and a forgery prevention data print unit 37.

The forgery prevention data generator 36 produces forgery prevention data based on the serial number of the printer 5. The forgery prevention data print unit 37 prints the forgery prevention data on the receipt paper 9 when transaction information is printed on the receipt paper 9. In this example, the forgery prevention data print unit 37 prints the forgery prevention data after the transaction information has been printed.

Data Terminal

A data terminal according to the first embodiment of the invention is described next with reference to FIG. 2. The data terminal 6 is desirably a so-called generic tablet data terminal, such as a tablet computer, that runs a web browser 7. The data terminal 6 has a touch panel 6a as the input/output device (input unit) (FIG. 1). The data terminal 6 includes a data terminal processor 40, and a wireless communication unit 41 that detects and connects to the wireless LAN 24.

The wireless communication unit 41 includes a network name acquisition unit 42, password input unit 43, and password transmitter 44. When a wireless LAN 24 is detected, the network name acquisition unit 42 gets the network name of the detected wireless LAN 24. The password input unit 43 is displayed on the touch panel 6a when a wireless LAN 24 is detected, and waits for input of the password for connecting to the wireless LAN 24. When the password is input to the password input unit 43, the password transmitter 44 sends the network name and password to the printer 5, which is an access point of the wireless LAN 24.

The data terminal 6 also has a camera 45 (FIG. 1) as a 2D code reader (input unit). The data terminal processor 40 of the data terminal 6 also has an analyzer 46 that analyzes the 2D code imaged by the camera 45 and supplies the result to the password input unit 43.

Configuring a POS System

Configuring a POS system according to the first embodiment of the invention is described next with reference to FIG. 3. FIG. 3 is a flow chart describing configuring a POS system according to the first embodiment of the invention.

Figure 3:
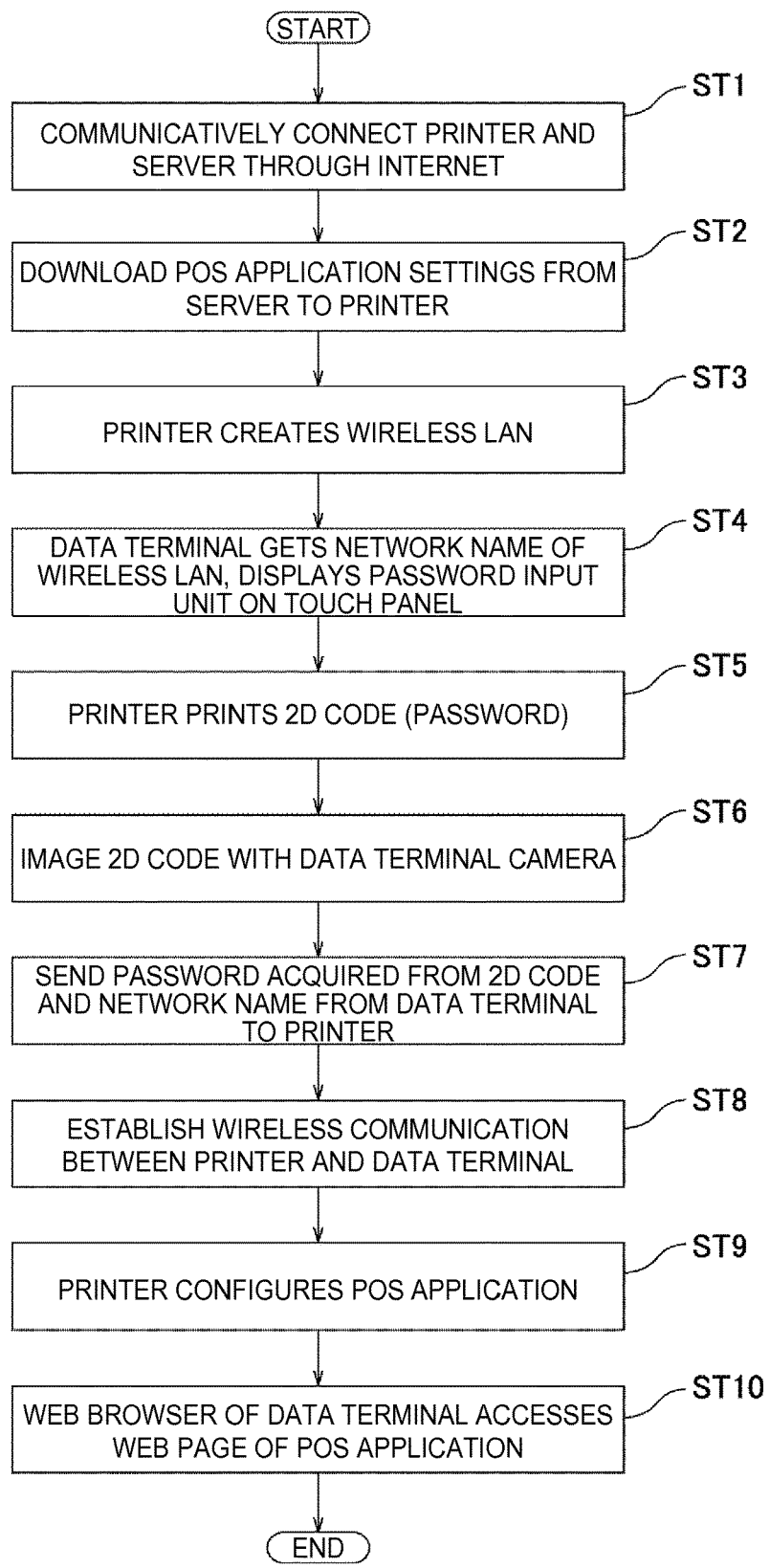
FIG. 3 is a flow chart showing the POS system configuration operation according to the first embodiment.

As shown in FIG. 3, to configure the POS system 1, the printer 5 is first connected to the Internet 4, enabling the printer 5 and server 3 to communicate (step ST1). More specifically, the Internet communication unit 23 communicatively connects the printer 5 and server 3. Once the printer 5 and server 3 can communicate, the configuration settings acquisition unit 34 of the printer 5 accesses the previously stored URL and gets the configuration settings of the POS application program 2 from the server 3 (step ST2). The local communication unit 25 of the printer 5 then creates a wireless LAN 24 with the network name created based on the serial number of the printer 5 (step ST3).

The data terminal 6 is then controlled to detect the wireless LAN 24. Once the data terminal 6 detects the wireless LAN 24, the network name acquisition unit 42 of the data terminal 6 gets the network name of the wireless LAN 24. Once the data terminal 6 detects the wireless LAN 24, the password input unit 43 for inputting the password is displayed on the touch panel 6a of the data terminal 6 (step ST4).

When the operator operates the switch 33 on the printer 5, receipt paper 9 with the 2D code printed thereon is output from the printer 5 (step ST5). The operator then scans the 2D code printed on the receipt paper 9 with the camera 45 of the data terminal 6 (step ST6), and the analyzer 46 of the data terminal 6 gets and supplies the password from the 2D code to the password input unit 43. When the password is supplied to the password input unit 43, the password transmitter 44 sends the password with the network name acquired by the data terminal 6 to the printer 5 (step ST7).

When the printer 5 receives the network name and password, the communication establishing unit 32 compares the received network name with the network name generated by the network name generator 27, and compares the received password with the password generated by the password generator 28. If the network names and passwords match, the communication establishing unit 32 establishes communication between the printer 5 and the data terminal (step ST8).

Once communication between the printer 5 and data terminal is established, the application configuration unit 35 of the printer 5 sends the database addresses contained in the configuration settings to the server 3, and sets the product information database 11 and transaction information database 12 used by the POS application program 2 (step ST9). The application configuration unit 35 of the printer 5 also causes the data terminal 6 to start the web browser 7 and access the URL contained in the configuration settings (step ST10). As a result, the web page 2a of the POS application program 2 running on the server 3 is displayed in the web browser 7 of the data terminal 6. The POS application program 2 can therefore be used from the data terminal 6.

Processing Operations on the POS System

Processing operations on the POS system according to the first embodiment of the invention are described next. In a transaction process in a store, for example, the operator inputs the product number and quantity of a product purchased by a customer to the web page 2a of the POS application program 2 displayed in the web browser 7 of the data terminal 6. Based on the input product number, the POS application program 2 retrieves the price by referencing the product information database 11, and processes the transaction based on the price and the quantity purchased. When the transaction process ends, the POS application program 2 displays the transaction information on the web page 2a, and the transaction information is thus displayed on the touch panel 6a of the data terminal 6. When the operator then operates the touch panel 6a and input a print receipt command, the transaction information is sent from the server 3 to the printer 5, and a receipt 8 is issued from the printer 5. The transaction information and forgery prevention data are printed on the issued receipt 8. The database is also updated on the server 3 based on the information at the same time the receipt 8 is issued.

The effect of the first embodiment is described below.

(1) A printer 5 communicatively connected to a server 3 through the Internet 4 has a communication relay function that communicatively connects a data terminal 6 with the server 3. Configuring the data terminal 6 to communicate with the Internet 4 is therefore not necessary. Because the printer 5 configures the POS application program 2 for use by the data terminal 6, there is also no need to apply settings for using the POS application program 2 to the data terminal 6. Configuring the data terminal 6 is therefore simple, and configuring the POS system 1 is simple. When the data terminal 6 is replaced due to a terminal failure, for example, reconfiguring is also simple. Because there are few settings to configure on the data terminal 6 in this embodiment, the POS application program 2 configuration settings can be prevented from leaking if the data terminal 6 is stolen, for example.

(2) Because the printer 5 gets the configuration settings of the POS application program 2 based on the serial number of the printer 5 as described above, the configuration settings of the POS application program 2 can be managed linked to the serial number of the printer 5.

(3) Because communication between the printer 5 and data terminal 6 is established using a network name and password as described above, the wireless LAN 24 is also secure. Furthermore, because the network name and password are generated based on the serial number of the printer 5, the network name and password of the wireless LAN 24 can be managed linked to the serial number.

(4) As described above, the password for establishing communication over the wireless LAN 24 is printed as a 2D code and output by the printer 5. The password is acquired on the data terminal 6 side by scanning the 2D code, and is sent to the printer 5. Inputting the password is therefore easy, and establishing communication between the printer 5 and data terminal 6 is simple.

(5) Forgery of a receipt 8 can therefore be prevented or suppressed because the printer that produced the receipt 8 can be easily identified.

Embodiment 2

A printer and a POS system as an example of a printing system according to a second embodiment of the invention are described below with reference to FIG. 4 to FIG. 6. Note that the second embodiment relates to the flow of data when the printing system is used after a connection is completed in the first embodiment. Note also that configurations and content that are the same as in the first embodiment are identified by like reference numerals, and further description thereof is omitted.

General Configuration of a POS System

Figure 4:
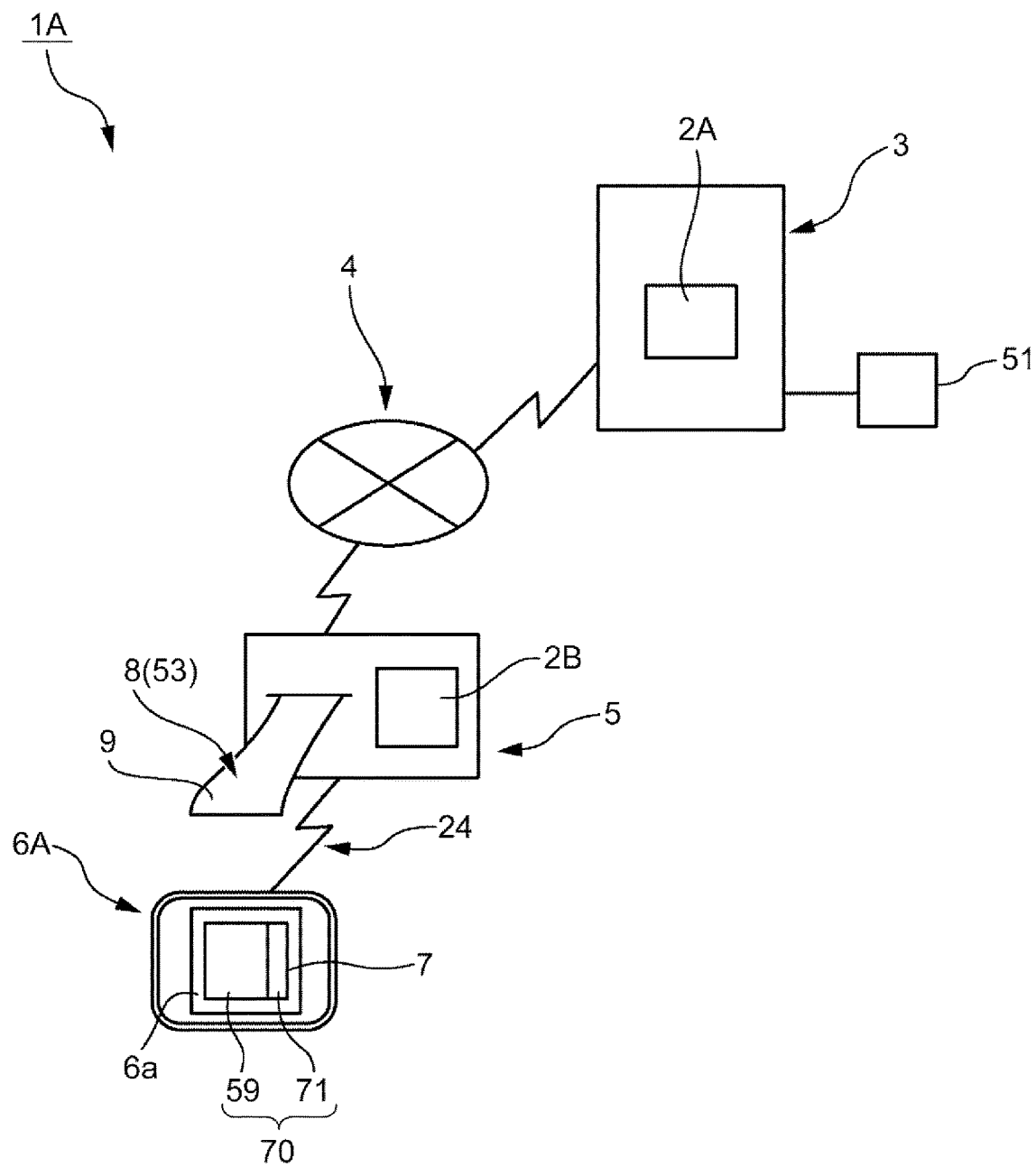
FIG. 4 schematically shows the configuration of a POS system according to a second embodiment of the invention.

The general configuration of POS system according to the second embodiment of the invention is described first with reference to FIG. 4. FIG. 4 shows the basic configuration of a POS system according to the second embodiment of the invention.

As shown in FIG. 4, the POS system 1A according to the second embodiment includes a server 3 on which a coupon-issuing application (first application program) 2A runs, a printer 5 on which a second POS application program (second application program) runs, and a data terminal 6A with a communication function. The printer 5 communicatively connects to the server 3 over the Internet (first network) 4. The data terminal 6 communicatively connects to the printer 5 over a wireless LAN (second network) 24, and communicatively connects to the server 3 through the printer 5. A computer 51 is connected as an input/output device to the server 3. In this embodiment the second POS application program 2B includes a product database that relationally stores product code, product name, and price information, a transaction database that stores transaction information, and a program for referencing and updating these databases.

The data terminal 6A and printer 5 are installed at a checkout counter in a store. The server 3 and computer 51 are, for example, installed in an office separated from the store. A web browser 7 runs on the data terminal 6A, and the coupon-issuing application 2A and second POS application program 2B can be used from the data terminal 6A through the web browser 7.

A transaction process for products purchased by a customer is executed at the checkout counter using the second POS application program 2B from the data terminal 6A, and a receipt 8 is issued from the printer 5. More specifically, the second POS application program 2B executes a transaction process based on the name and quantity of the purchased products input to the data terminal 6A and the amount paid by the customer, and generates transaction information (print data). When the transaction information is generated, the printer 5 prints the transaction information on receipt paper 9. Using the coupon-issuing application 2A from the data terminal 6A, a coupon 53 is also issued from the printer 5 at the checkout counter. More specifically, based on a print coupon command (first data) input to the data terminal 6A, coupon print data (second print data) is sent from the coupon-issuing application 2A of the server 3 to the printer 5. When the printer 5 receives the coupon print data, the printer 5 prints the coupon print data on receipt paper 9. The coupon 53 is, for example, a ticket providing a discount off the product purchase amount the next time the customer comes to the store.

Server

The server is described next with reference to FIG. 5 and FIG. 6. FIG. 5 is a schematic block diagram of the POS system according to the second embodiment of the invention. FIG. 6 describes a third web page displayed on the data terminal in the second embodiment, and more specifically describes a web page displayed through the web browser 7 on the touch panel of the data terminal 6A. FIG. 6(a) shows an example of the web page when the server 3 and printer 5 are communicatively connected, and FIG. 6(b) shows an example when the connection between the server 3 and printer 5 is interrupted.

Figure 5:
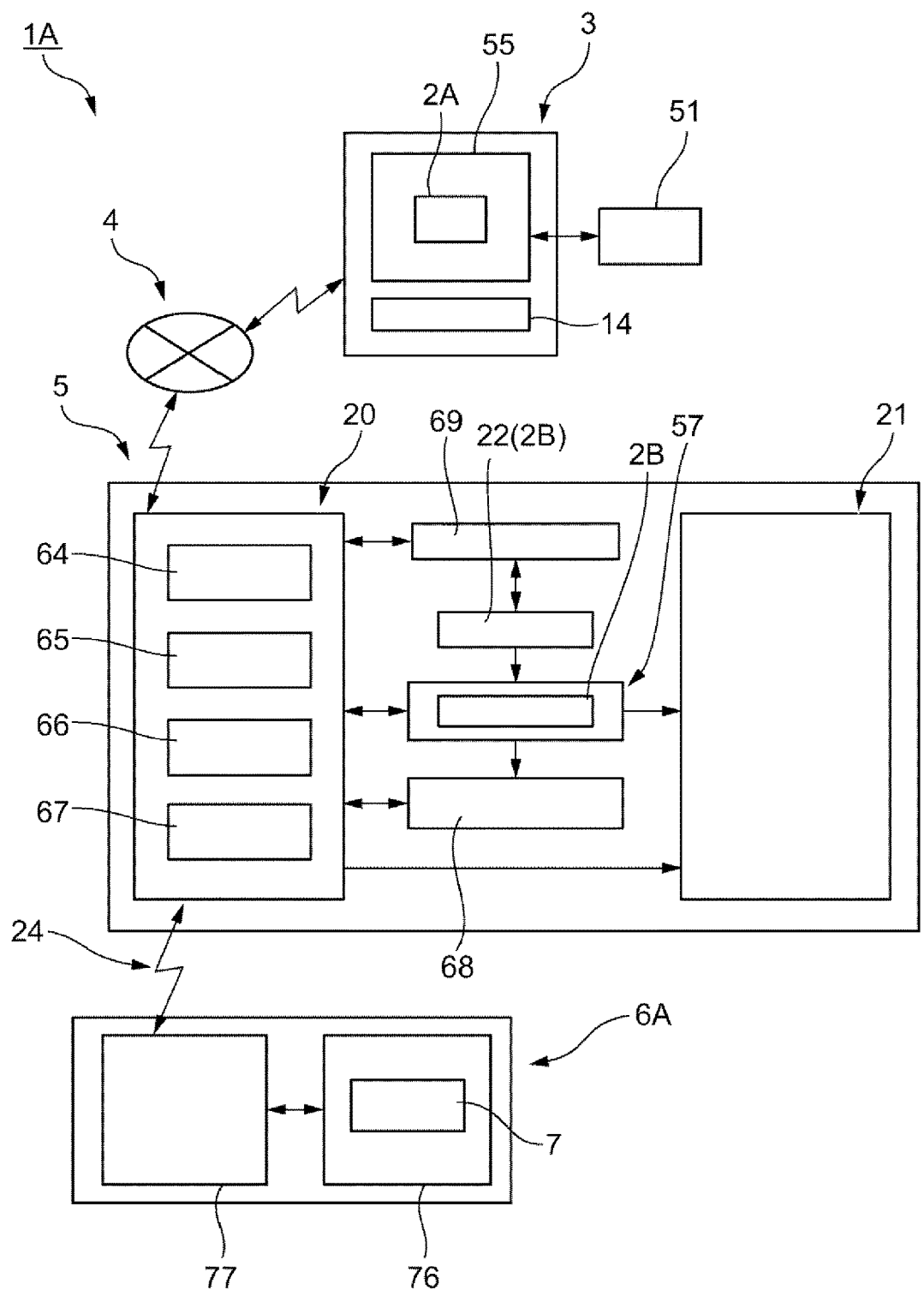
FIG. 5 is a basic block diagram of a POS system according to the second embodiment.
Figure 6A:
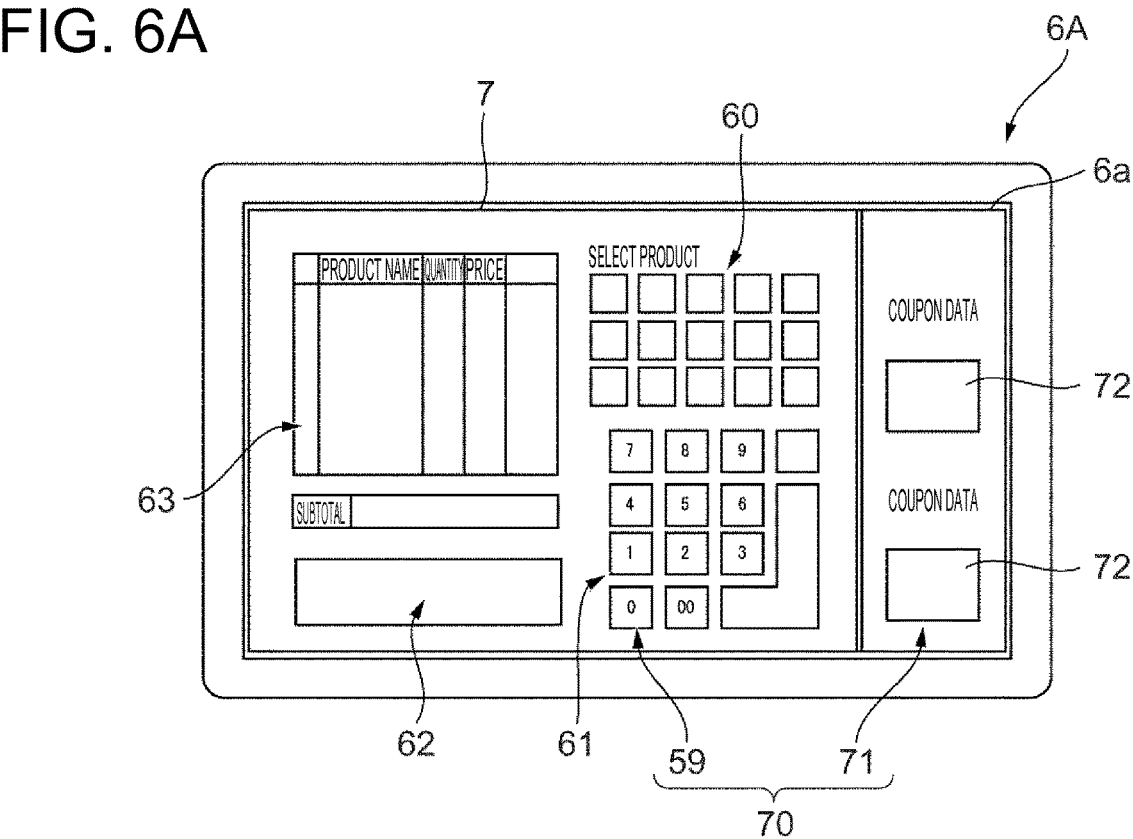
FIGS. 6A and 6B illustrate a third web page displayed on a data terminal according to the second embodiment of the invention.
Figure 6B:
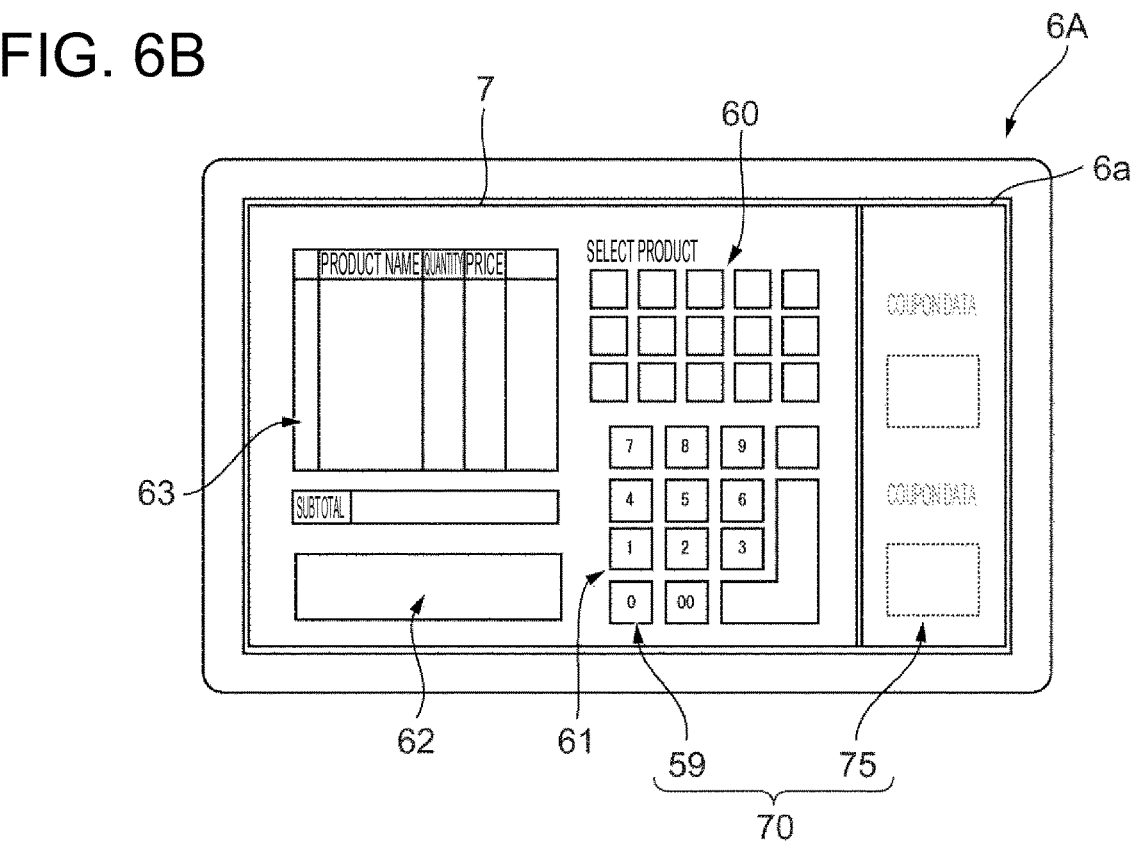

As shown in FIG. 5, the server 3 has a processor 55 that runs the coupon-issuing application 2A.

The coupon-issuing application 2A produces coupon print data for producing a coupon 53 based on information input from the computer 51. The coupon-issuing application 2A displays coupon information for coupons 53 that can be printed in the store on the data terminal 6A, and generates a first web page (first display information) 71 enabling inputting a print coupon command from the data terminal 6A. The first web page 71 is written in HTML, and as shown in FIG. 6(a) has a print coupon command input button 72 for inputting a print coupon command. When a print coupon command is received from the data terminal 6A side, the coupon-issuing application 2A sends coupon print data to the printer 5 based on the received print coupon command.

The server 3 has a configuration settings storage unit 14 that stores the second POS application program 2B. The latest version of the second POS application program 2B is stored in the configuration settings storage unit 14 when the operating system is updated.

Printer

A printer according to the second embodiment of the invention is described with reference to FIG. 5. As shown in FIG. 5, the printer 5 has a printer processor 57 as a processor that runs the second POS application program 2B, a communication unit 20 that controls communication with an external device, and a print unit 21 that controls printing. The printer processor 57 is connected to memory 22 that stores the second POS application program 2B.

When the printer 5 power turns on, the printer processor 57 reads and runs the second POS application program 2B from memory 22. The second POS application program 2B run by the printer processor 57 generates a second web page (second display information) 59 for executing a transaction process through the web browser 7 of the data terminal 6A. The second web page 59 is written in HTML, and as shown in FIGS. 6(a) and (b), has product name input buttons 60 for inputting the names of purchased products to the second POS application program 2B, a keypad 61 for inputting product quantity and payment amount information to the second POS application program 2B, a print receipt command input button 62 for inputting a print receipt command to the second POS application program 2B, and a transaction information display area 63.

When the second POS application program 2B receives product name, purchased quantity, and payment amount information (second information) input through the second web page 59 from the data terminal 6A, it acquires the product price from the product database based on the product name, executes the transaction process based on the product price, quantity, and payment amount, and displays progress of the transaction process and the transaction information in the transaction information display area 63. In addition, when a print receipt command (second information) input through the second web page 59 is received, the second POS application program 2B supplies the transaction information to the print unit 21. Parallel to this, the second POS application program 2B stores the transaction information in the transaction database. Note that the printer processor 57 can read and run the second POS application program 2B from memory 22 any time after communication between the printer 5 and server 3 is established.

The communication unit 20 has an Internet communication unit (first communication unit) 64, a local communication unit (second communication unit) 65, a communication relay 66, and a connection monitor 67. The Internet communication unit 64 communicatively connects the server 3 and printer 5 through the Internet 4. The local communication unit 65 communicatively connects the printer 5 and data terminal 6A through a wireless LAN 24. The communication relay 66 communicatively connects the data terminal 6A and server 3 through the wireless LAN 24 and Internet 4. More specifically, when the printer 5 receives a print coupon command from the data terminal 6A, the communication relay 66 sends the print coupon command through the Internet 4 to the server 3.

The connection monitor 67 monitors the connection between the server 3 and printer 5, that is, the Internet 4 connection. When the connection monitor 67 reports that the connection with the server 3 was interrupted, the communication unit 20 stops transmission from the printer 5 to the server 3. More specifically, when the connection monitor 67 detects that the connection to the server 3 was interrupted, the communication unit 20 functions as an input/output termination unit that stops transmission from the printer 5 to the server 3.

When transaction information is supplied from the second POS application program 2B, the print unit 21 prints the transaction information on receipt paper 9. When the Internet communication unit 64 receives coupon print data from the server 3, the print unit 21 also prints the coupon print data on receipt paper 9.

The printer 5 also has a data merging unit 68 and an application program updater 69.

The data merging unit 68 gets the first web page 71 generated by the coupon-issuing application 2A, combines this first web page 71 with the second web page 59 generated by the second POS application program 2B, and creates the third web page (third display information) 70 shown in FIG. 6(a). More specifically, the data merging unit 68 accesses a specific address on the server 3 through the Internet 4, and acquires the first web page 71. The data merging unit 68 then uses HTML frame tags, for example, to combine the first web page 71 and second web page 59, and generate a single combined third web page 70.

When the connection monitor 67 detects that the server 3 connection was interrupted, the data merging unit 68 combines a fourth web page (stop input data) 75, which indicates that input of a print coupon command from the data terminal 6A is not received, instead of the first web page 71 with the second web page 59, and outputs the third web page 70 as shown in FIG. 6(b). When the connection monitor 67 detects that the server 3 connection was restored, the data merging unit 68 again gets the first web page 71 generated by the coupon-issuing application 2A, combines the second web page 59 generated by the second POS application program 2B with the first web page 71, and outputs the third web page 70 as shown in FIG. 6(a). The print coupon command input button 72 in the first web page 71 is either omitted or disabled in the fourth web page 75 as shown in FIG. 6(b). The data merging unit 68 thus functions as an input/output termination unit that stops input of a print coupon command in the data terminal 6A when interruption of the server 3 connection is detected by the connection monitor 67.

The application program updater 69 regularly accesses the configuration settings storage unit 14 of the server 3, and compares the version of the second POS application program 2B stored in the configuration settings storage unit 14 with the version of the second POS application program 2B stored in memory 22 on the printer 5. When the version of the second POS application program 2B stored in the configuration settings storage unit 14 is newer than the version of the second POS application program 2B stored in memory 22, the application program updater 69 gets the second POS application program 2B from the configuration settings storage unit 14 of the server 3, and updates the second POS application program 2B stored in memory 22. The programs and product databases in the second POS application program 2B are thus updated to the new version.

Data Terminal

The data terminal according to the second embodiment is described next with reference to FIG. 5.

As shown in FIG. 5, the data terminal 6A is a generic device, such as a generic tablet-type input/output terminal or computer 51, on which a web browser 7 runs. The data terminal 6A has a touch panel 6a as the input/output device. The data terminal 6A includes a data terminal processor 76 that runs a web browser 7, and a data terminal communication unit 77 that communicatively connects to the printer 5 and data terminal 6A through the wireless LAN 24.

When the data terminal 6A is connected to the wireless LAN 24 and the web browser 7 starts, the web browser 7 accesses the printer 5 and displays the third web page 70. As a result, the coupon information of the coupon 53 to be printed and the print coupon command input button 72 are displayed on the touch panel 6a of the data terminal 6A, and a print coupon command can be input through the touch panel 6a. The product name input buttons 60 and keypad 61 are also displayed on the touch panel 6a of the data terminal 6A, and the product name, quantity, and payment amount can be input through the touch panel 6a. The print receipt command input button 62 is also displayed on the touch panel 6a of the data terminal 6A, and a print receipt command can be input. Information such as the input print coupon command, product name, purchased quantity, payment amount, and print receipt command input is then sent through the web browser 7 to the printer 5 by tapping appropriately on the print coupon command input button 72, product name input buttons 60, keypad 61, and print receipt command input button 62. The web browser 7 together with hardware such as the touch panel 6a of the data terminal 6A and the data terminal communication unit 77 thus embodies a display unit that acquires and displays a third web page 70 from the printer 5; an input unit that receives a print coupon command input to the coupon-issuing application 2A, and product name, purchase quantity, payment information, and a print receipt command input to the second POS application program 2B; and a transmission unit that sends the print coupon command, product name, purchase quantity, payment information, and print receipt command input to the input unit to the printer 5.

Processing Operations on the POS System

Processing operations on the POS system according to the second embodiment of the invention are described next. When a customer processes a transaction in a store, for example, the operator inputs the product name and quantity of each product purchased by the customer through the third web page 70 displayed on the web browser 7 of the data terminal 6A. The input product name and quantity are sent from the data terminal 6A to the printer 5, the transact ion process is executed by the second POS application program 2B on the printer 5. Progress of the transaction process is displayed in the transaction information display area 63 of the third web page 70. When information for all purchased products is input and the operator receives the payment amount from the customer, the payment amount is sent from the data terminal 6A to the printer 5. This completes the transaction process, and the second POS application program 2B generates transaction information and displays the transaction information in the transaction information display area 63 of the third web page 70.

When the operator then taps the print receipt command input button 62 and inputs a print receipt command, the print receipt command is sent from the data terminal 6A to the printer 5. When the printer 5 receives the print receipt command, the second POS application program 2B supplies the transaction information to the print unit 21, and a receipt 8 with the printed transaction information is issued from the printer 5.

The operator then issues the coupon 53. If communication between the printer 5 and server 3 is possible when the operator tries to issue the coupon 53, the print coupon command input button 72 is displayed as shown in FIG. 6(a) on the third web page 70 presented in the web browser 7 of the data terminal 6A because the data merging unit 68 has combined the first web page 71 and second web page 59. The operator can therefore tap on the print coupon command input button 72 in the third web page 70 on the data terminal 6A, and issue a print coupon command to the data terminal 6A.

When a print coupon command is input to the data terminal 6A, the print coupon command is sent from the data terminal 6A through the printer 5 to the server 3. When the server 3 receives the print coupon command, the coupon-issuing application 2A sends coupon print data corresponding to the tapped print coupon command input button 72 to the printer 5. When the printer 5 receives the coupon print data, the coupon print data is supplied to the print unit 21, and a coupon 53 is output from the printer 5. The operator then hands the issued receipt 8 and coupon 53 to the customer, and completes the transaction.

If the connection between the printer 5 and server 3 was interrupted when the operator tries to issue a coupon 53, the print coupon command input button 72 is not displayed as shown in FIG. 6(b) on the third web page 70 presented in the web browser 7 of the data terminal 6A because the data merging unit 68 has combined the fourth web page 75 and second web page 59, and a print coupon command cannot be input. The operator therefore hands only the issued receipt 8 to the customer and ends the transaction.

The effect of the second embodiment is described below.

(1) As described above, the printer 5 functions as a relay that communicatively connects the server 3 and data terminal 6A, and the data merging unit 68 of the printer 5 gets a first web page 71 generated by the coupon-issuing application 2A, and combines the first web page 71 with a second web page 59 generated by the second POS application program 2B running on the printer 5, creating a third web page 70 that can be displayed on the data terminal 6A. The forgery prevention data generator 36 of the printer 5 then relays to the server 3 a print coupon command input to the data terminal 6A and sent to the printer 5. Both a coupon-issuing application 2A running on the server 3 and a second POS application program 2B running on the printer 5 can therefore be used from the data terminal 6A.

(2) As described above, because the application program run by the printer 5 is the second POS application program 2B for executing a transaction process that is central to business operation, and the application program run by the server 3 is a coupon-issuing application 2A for performing tasks complementary to essential business operations, performing tasks essential to business operations can continue using the second POS application program 2B even when the Internet 4 connection is unstable.

(3) As described above, when loss of the connection to the server 3 is reported, the data merging unit 68 merges a fourth web page 75, which shows that input of the print coupon command from the data terminal 6A is disabled, instead of the first web page 71 with the second web page 59 to create the third web page 70, and stops input of a print coupon command on the data terminal 6A. As a result, transactions that rely on an Internet 4 connection can be avoided when the Internet 4 connection is interrupted. The operator of the data terminal 6A can also be informed that the coupon-issuing application 2A cannot be used because the Internet 4 connection is broken.

(4) As described above, because the printer 5 has an application program updater 69, programs such as the second POS application program 2B running on the printer 5 can be regularly updated to the new version. Managing the version of the second POS application program 2B is therefore simple.

Preferred embodiments of the invention are described above, but the foregoing embodiments can be modified as desired in many ways without departing from the scope of the invention. Some examples of such other embodiments are described below.

The printer 5 and data terminal 6 (6A) are connected by a wireless LAN 24 in the foregoing embodiments, but could be communicatively connected using a cable. In the foregoing embodiments the printer 5 generates a network name, password, and forgery prevention data based on a serial number, but these could be generated based on the MAC address of the printer 5, for example. The password generator 28 could also be configured to include the forgery prevention data generator 36.

In the foregoing embodiments the password output unit 29 prints the password as a 2D code, but if the printer 5 has a display, the password output unit 29 could present the password on the display as a 2D code. In this configuration the data terminal 6 can acquire the 2D code by imaging the display with the camera 45. The password output unit 29 could also directly output the password. In this configuration, the operator can simply read and input the password to the password input unit 43 of the data terminal 6.

Further alternatively, the password output unit 29 could output the password as a printed encrypted number. In this configuration, the analyzer 46 of the data terminal 6 can analyze the encrypted numeric string imaged by the camera 45, and supply the result to the password input unit 43. Alternatively, the operator could read and input the encrypted number from the printout to the touch panel 6a, and the analyzer 46 of the data terminal 6 then analyze the encrypted numeric string input to the touch panel 6a and supply the result to the password input unit 43.

Further alternatively, the password output unit 29 could output an encrypted password code by near-field communication. In this configuration, the data terminal 6 has a receiver that receives the code by near-field communication, and the analyzer 46 of the data terminal 6 analyzes the code received by the receiver, acquires the password, and supplies the password to the password input unit 43.

The server 3 outputs transaction information to the printer 5 and produces a receipt 8 based on input of a print receipt command to the web page 2a in the foregoing embodiments, but if the data terminal 6 is configured to acquire transaction information from the server 3 when the transaction information is displayed in the web browser 7, the transaction information could be sent from the data terminal 6 to the printer 5 to print a receipt 8 based on input of a print receipt command to the web page 2a.

Next, the local communication unit 25 of the printer 5 could be configured with the ability to restrict the information devices that can connect to the wireless LAN 24.

In this configuration the local communication unit 25 has a unique data terminal identifier acquisition unit that acquires a unique data terminal identifier specific to the data terminal 6 from the data terminal 6 when establishing communication with a data terminal 6, and a connection control unit that restricts the data terminal 6 that communicatively connect to the printer 5 based on the unique data terminal identifier. This unique data terminal identifier could be, for example, an ID code stored in the data terminal 6 (such as the MAC address), an optically readable ID code affixed to the data terminal 6, or electronic tag data (such as an RFID tag) affixed to the data terminal 6. This configuration can improve the security of the wireless LAN 24 between the printer 5 and data terminal 6.

Further alternatively, the local communication unit 25 could have a unique data terminal identifier acquisition unit that acquires a unique data terminal identifier specific to the data terminal 6 from the data terminal 6 when establishing communication with a data terminal 6; a password mixer that combines all or part of printer-specific identification information, data terminal connection attributes sent from the server 3, the unique data terminal identifier, and time information in the password generator 28; and a connection control unit that restricts connecting to the printer 5 and server 3 from a data terminal 6 that communicatively connects to the printer 5 based on all or some of the unique data terminal identifier, the printer-specific identification information, the data terminal connection attributes, and the time information. The data terminal connection attributes sent from the server 3 include information such as the number of data terminals 6 allowed to connect to the printer 5; the type or model of data terminal 6 that can connect; and the time communication between the data terminal 6 and server 3 is allowed. The data terminal connection attributes could also include the ID of the operator permitted to operate the data terminal 6; the identification number of the POS application program 2 that can be used from the data terminal 6; or the URL on the Internet 4 to which the data terminal 6 can connect through the printer 5. This configuration can improve the security of the wireless LAN 24 between the printer 5 and data terminal 6, and can improve the security of communication between the data terminal 6 and server 3 through the printer 5.

The connection control unit could also monitor the operating log of the data terminal 6, and based on an operating log pattern previously registered in the memory 22 of the printer 5, for example, change connection rights and/or present operating instructions to the operator that used the touch panel 6a of the data terminal 6. This configuration simplifies establishing communication between the printer 5 and data terminal 6.

In this event, the connection control unit could be configured to display a re-input prompt requiring the operator to re-enter the unique data terminal identifier using the touch panel 6a of the data terminal 6 if the operating log of the data terminal 6 has not been updated for longer than a set period of time, and if the data is not re-entered within the set time, prohibit or restrict the data terminal 6 from connecting to the printer 5 and prompt entering the data again. This configuration can further improve security between the server 3, printer 5, and data terminal 6.

In this configuration, the connection control unit could also prohibit or restrict connection of the data terminal 6 to the printer 5, display a prompt requiring re-entering the password using the touch panel 6a of the data terminal 6, and/or prohibit or restrict operation of the data terminal 6 when an operating log pattern indicating mistaken operation appears repeatedly in the operating log, the data terminal 6 attempts to access information the data terminal 6 is not permitted to access, the communication signal strength is below a specific signal level, or the power supply capacity of the data terminal 6 is insufficient. This configuration can further improve security between the server 3, printer 5, and data terminal 6.

The printer 5 and data terminal 6 can also communicatively connect using a cable in the above examples.

When loss of a connection to the server 3 is reported when the forgery prevention data generator 36 relays a print coupon command received from the data terminal 6 to the server 3, the above embodiments could alternatively be configured to temporarily store the print coupon command and then send the print coupon command to the server 3 after the server 3 connection is restored. More specifically, when loss of the Internet 4 connection is detected after a print coupon command is input to the data terminal 6, sending the print coupon command to the server 3 could be delayed until after the connection is restored and the coupon 53 then issued.

When loss of the connection to the server 3 is detected in the above embodiments, the data merging unit 68 merges the fourth web page 75, which disables receiving input of a print coupon command from the data terminal 6, instead of the first web page 71 with the second web page 59 to produce the third web page 70, but when loss of the connection to the server 3 is detected, the data merging unit 68 could merge the first web page 71, the fourth web page 75 that disables receiving input of a print coupon command from the data terminal 6, and the second web page 59 to produce the third web page 70.

Further alternatively, when loss of the connection to the server 3 is detected, the data merging unit 68 could output stop-input information indicating that input of a print coupon command from the data terminal 6 is stopped by outputting sound from the data terminal 6. In this configuration, the data merging unit 68 merges a fourth web page 75 containing a command that outputs sound from the data terminal 6 with the second web page 59 to create the third web page 70. Further alternatively, when loss of the connection to the server 3 is detected, the data merging unit 68 could output stop-input information indicating that input of a print coupon command from the data terminal 6 is stopped by producing vibration from the data terminal 6. In this configuration, the data merging unit 68 merges a fourth web page 75 containing a command that causes the data terminal 6 to vibrate with the second web page 59 to create the third web page 70.

The print unit 21 in the foregoing embodiments prints the transaction information on receipt paper 9 when transaction information is supplied from the second POS application program 2B, and prints the coupon print data on receipt paper 9 when the Internet communication unit 64 receives coupon print data from the server 3, but the print unit 21 could alternatively have a print control unit that, when coupon print data is received, controls whether or not to print the coupon print data, the printing range, the printing position, and the print timing, and prints the coupon print data merged with the transaction information.

The server 3 could also store access rights information related to the range of the coupon-issuing application 2A that can be accessed through the printer 5 related to the ID of the printer 5, and the printer 5 could be configured with an access control unit that accesses the server 3 and acquires access rights information based on the printer 5 ID, and limits access to the coupon-issuing application 2A accordingly. In this configuration, the data merging unit 68 can merge the first web page 71, the second web page 59, and the access rights information to create the third web page 70. This configuration can further improve the security of the POS system 1A because access to the server 3 from a data terminal 6 connected to the printer 5 can be restricted.

The coupon-issuing application 2A and the second POS application program 2B respectively create the first web page 71 and second web page 59 written in HTML in the above embodiments, but the coupon-issuing application 2A and second POS application program 2B could also conceivably be written in HTML. The data merging unit 68 that combines the first display information created by the coupon-issuing application 2A, and the second display information created by the second POS application program 2B, could alternatively be configured to create the third web page combining the first display information and the second display information using HTML.

When loss of a connection between the server 3 and printer 5 is detected in the above embodiments, the data merging unit 68 stops receiving a print coupon command by displaying the fourth web page 75, but the printer 5 could conceivably have a stop input unit that sends a script or command stopping input of a print coupon command to the data terminal 6 when loss of a connection between the server 3 and printer 5 is detected, and stops input of a print coupon command from the third web page 70.

The application program running on the server 3 is a coupon-issuing application 2A and the application program running on the printer 5 is a second POS application program 2B in the above embodiments, but these application programs are only used as examples, and a printing system using the invention is not limited to a POS system 1A.

INDUSTRIAL APPLICABILITY

As described above, the invention is advantageous in a printing system, a printer, and a POS system, and is particularly well-suited to applications that use both an application program running on a server and an application program running on a printer from a data terminal in an environment in which a printer is communicatively connected between a data terminal and a server through a network.

REFERENCE SIGNS LIST 1, 1A POS system as an example of a printing system
2 POS application program as an example of a printing application program
2A coupon printing application as an example of a first application program
2B second POS application program as an example of second application program
3 server
4 Internet
5 printer
6, 6A 6, 6A data terminal
7 web browser
8 receipt
10 processor
13 database unit
20 communication unit
21 print unit
22 memory
23 Internet communication unit
25 communication unit
27 network name generator
28 password generator
29 password output unit
30 network name receiver
31 password receiver
34 configuration settings acquisition unit
35 application configuration unit
36 forgery prevention data generator
37 forgery prevention data print unit
40 data terminal processor
42 network name acquisition unit
43 password input unit
44 password transmitter
46 analyzer
51 computer
53 coupon
55 processor
57 printer processor
59 second web page
63 transaction information display area
64 Internet communication unit
68 data merging unit
69 application program updater
70 third web page
71 first web page
72 print coupon command input button
75 fourth web page

The invention claimed is:

1. A printing system comprising:
a server comprising:
 a memory storing:
  a point-of-sale (POS) application, and
  configuration information including location information to use the POS application, wherein the configuration information is associated with printer-specific identification information; and
 a processor configured to execute the POS application;
a data terminal including a communication interface; and
a printer configured to:
 communicatively connect the data terminal and the server through a network,
 request, from the server, configuration information corresponding to printer-specific identification information of the printer, the request including the printer-specific identification information, and
 receive, from the server, the configuration information including the location information; and
 transmit a command to the data terminal to access and display display information generated by the POS application using the location information, the command including the location information,
wherein the data terminal is configured to receive the command from the printer and access, via the printer, the POS application of the server using the location information included in the received command.

2. The printing system described in claim 1, further comprising a communication unit, wherein:
the communication unit comprises:
 a password generating unit configured to generate a password based on the printer-specific identification information,
 a password output unit configured to output the password,
 a password receiving unit configured to receive the password from the data terminal, and
 a communication establishing unit configured to establish communication with the data terminal based on the password generated by the password generating unit and the password received by the password receiving unit; and
wherein the data terminal comprises a password input unit configured to receive input of the password, and a password transmitting unit configured to send the password received by the password input unit to the printer.

3. The printing system described in claim 2, wherein:
the communication unit further comprises:
 a unique data terminal identifier acquisition unit configured to acquire a unique data terminal identifier specific to the data terminal from the data terminal when establishing communication with the data terminal;
 a password mixing unit configured to combine all or part of the printer-specific identification information, data terminal connection attributes received from the server, the unique data terminal identifier, and time information in the password generating unit; and
 a connection control unit configured to limit connection to the printer and the server from a data terminal that communicatively connects to the printer based on all or part of the unique data terminal identifier, the printer-specific identification information, the data terminal connection attributes, and the time information.

4. The printing system described in claim 2, wherein:
the password output unit is configured to print the password as an optically readable code; and
the data terminal comprises an input unit configured to receive the code, and an analyzing unit configured to analyze the code, and to acquire and supply the password to the password input unit.

5. The printing system described in claim 2, wherein:
the password output unit is further configured to output a code encrypting the password by near-field communication; and the data terminal comprises a receiving unit configured to receive the code, and an analyzing unit configured to analyze the code, and to acquire and supply the password to the password input unit.

6. The printing system described in claim 3, wherein:
the unique data terminal identifier is an ID code stored in the data terminal, an optically readable ID code of fixed to the data terminal, or electronic tag data affixed to the data terminal.

7. The printing system described in claim 2, wherein:
the printer comprises a forgery prevention data generating unit configured to generate forgery prevention data in the password generating unit, and a forgery prevention data print unit configured to print the forgery prevention data on the print medium when printing on the print medium.

8. The printing system described in claim 1, wherein:
the server is configured to execute a first application program;
the printer is configured to execute a second application program;
the network includes a first network and a second network;
the printer is communicatively connected to the server through the first network;
the data terminal is communicatively connected to the printer through the second network;
the printer comprises:
  a data merging unit configured to acquire first display information generated by the first application program, and configured to generate third display information by performing operations that include combining the first display information with second display information generated by the second application program, and
  a print unit that prints print data generated by the second application program; and
the data terminal comprises a display unit that acquires and displays the third display information.

9. The printing system described in claim 8, wherein:
the data terminal comprises an input unit configured to receive first information input to the first application program and second information input to the second application program, and a transmission unit configured to send the first information and the second information received by the input unit to the printer; and
the printer comprises a communication relay unit configured to send the first information from the data terminal to the server.

10. The printing system described in claim 9, wherein:
the printer comprises a connection monitor configured to monitor the connection to the server, and an input/output termination unit configured to stop at least one of receiving the first information by the input unit and transmission to the server when interruption of a server connection is detected.

11. The printing system described in claim 10, wherein:
the data merging unit is further configured to combine stop-input data indicating input of the first information from the data terminal is stopped with the second display information to generate the third display information when interruption of the server connection is detected.

12. The printing system described in claim 10, wherein:
the data merging unit is further configured to output stop-input data indicating input of the first information from the data terminal is disabled by sound from the data terminal when interruption of the server connection is detected.

13. The printing system described in claim 10, wherein:
the data merging unit is further configured to output stop-input data indicating input of the first information from the data terminal is disabled by vibration from the data terminal when interruption of server connection is detected.

14. The printing system described in claim 9, wherein:
the communication relay unit is further configured to temporarily store the first information if loss of a server connection is detected when sending the first information to the server, and to send the first information to the server after the server connection is re-established.

15. The printing system described in claim 8, wherein:
the data terminal is further configured to execute a web browser; and
the web browser embodies the display unit, the input unit, and the transmission unit.

16. The printing system described in claim 8, wherein:
the first application program is configured to generate and send second print data to the printer; and
the print unit comprises a print control unit configured to determine, when the printer receives the second print data, whether or not to print, the printing range, the printing position, and the print timing of the second print data, to combine the second print data with the print data, and to print.

17. The printing system described in claim 8, wherein:
the first application program is a coupon-issuing application configured to generate coupon print data to print a coupon based on the first display information;
the second application program is a second POS application program configured to generate transaction information to print a receipt based on the second display information;
the transaction information is the print data; and
the coupon print data is second print data.

18. A printer of the printing system described in claim 1.

19. A printer comprising:
a first communication circuit configured to communicatively connect to a server through a first network, and to receive, from the server, first display information generated by a first application executed by the server;
a processor configured to:
  execute a second application and to thereby generate second display information;
  combine the first display information with the second display information to generate third display information displayable by a data terminal, and
  combine the second display information with stop-input data to generate fourth display information;
a printing structure configured to print data generated by the second application; and
a second communication circuit configured to transmit display information to the data terminal over a second network, wherein the second communication circuit transmits the third display information when a connection with the server is not interrupted, and transmits the fourth display information instead of the third display information when the connection with the server is interrupted.

20. The printer described in claim 19, further comprising:
an input/output termination unit configured to stop at least one of receiving the first information by the input unit and transmission to the server when interruption of the connection with the server is detected.

* * * * *